United States Patent
Vegi et al.

(10) Patent No.: US 12,536,488 B2
(45) Date of Patent: Jan. 27, 2026

(54) DETERMINING MACHINE LEARNING MODEL ANOMALIES AND IMPACT ON BUSINESS OUTPUT DATA

(71) Applicant: JPMorgan Chase Bank, N.A., New York, NY (US)

(72) Inventors: Rajesh Vegi, Bear, DE (US); Venkata Ramana Rao Nallajarla, Hockessin, DE (US); Ramesh Koppisetty, Kennett Square, PA (US); Venu Nelluri, Westborough, MA (US); Sambasiva R Vadlamudi, Garnet Valley, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 298 days.

(21) Appl. No.: 18/129,777

(22) Filed: Mar. 31, 2023

(65) Prior Publication Data
US 2024/0330824 A1   Oct. 3, 2024

(51) Int. Cl.
*G06Q 10/0637* (2023.01)
(52) U.S. Cl.
CPC .............................. *G06Q 10/06375* (2013.01)
(58) Field of Classification Search
CPC ............................................... G06Q 10/06375
See application file for complete search history.

(56) References Cited

U.S. PATENT DOCUMENTS

| | | | |
|---|---|---|---|
| 10,586,234 B2 * | 3/2020 | Mueller | G06Q 20/4016 |
| 2020/0311736 A1 * | 10/2020 | Song | G06Q 20/3823 |
| 2024/0193411 A1 * | 6/2024 | Navratil | G06N 3/045 |

* cited by examiner

*Primary Examiner* — Deirdre D Hatcher
(74) *Attorney, Agent, or Firm* — Greenblum & Bernstein, P.L.C.

(57) ABSTRACT

In one example, a non-transitory computer-readable storage medium with program instructions for determining anomalies in machine learning models and impact on business output data thereof is disclosed. The method accesses machine learning model variables for a machine learning model, and determines a deviation in behavior of the machine learning model by performing statistical analysis on each machine learning model variable to identify statistical differences between machine learning model variable data captured in a given time window and data captured in a previous time window at the same time of a prior day, prior week, etc. If statistical differences exist, the method performs anomaly detection to determine whether the statistical differences are an anomaly. If so, the method determines whether the anomaly causes an impact on business decision output data, and if so, identifying a root cause and generating a notification alert for corrective action.

18 Claims, 7 Drawing Sheets

DETERMINING MACHINE LEARNING MODEL ANOMALIES AND IMPACT ON BUSINESS OUTPUT DATA

BACKGROUND

Machine learning models are becoming ubiquitous. A large number of such machine learning models are being deployed into production yearly. Many models can process large volumes of data to recognize and correlate data patterns and trends associated with a production system. Some machine learning models may utilize training data for learning, and as training progresses, the machine learning model becomes increasingly accurate.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

DETAILED DESCRIPTION

Figure 1:
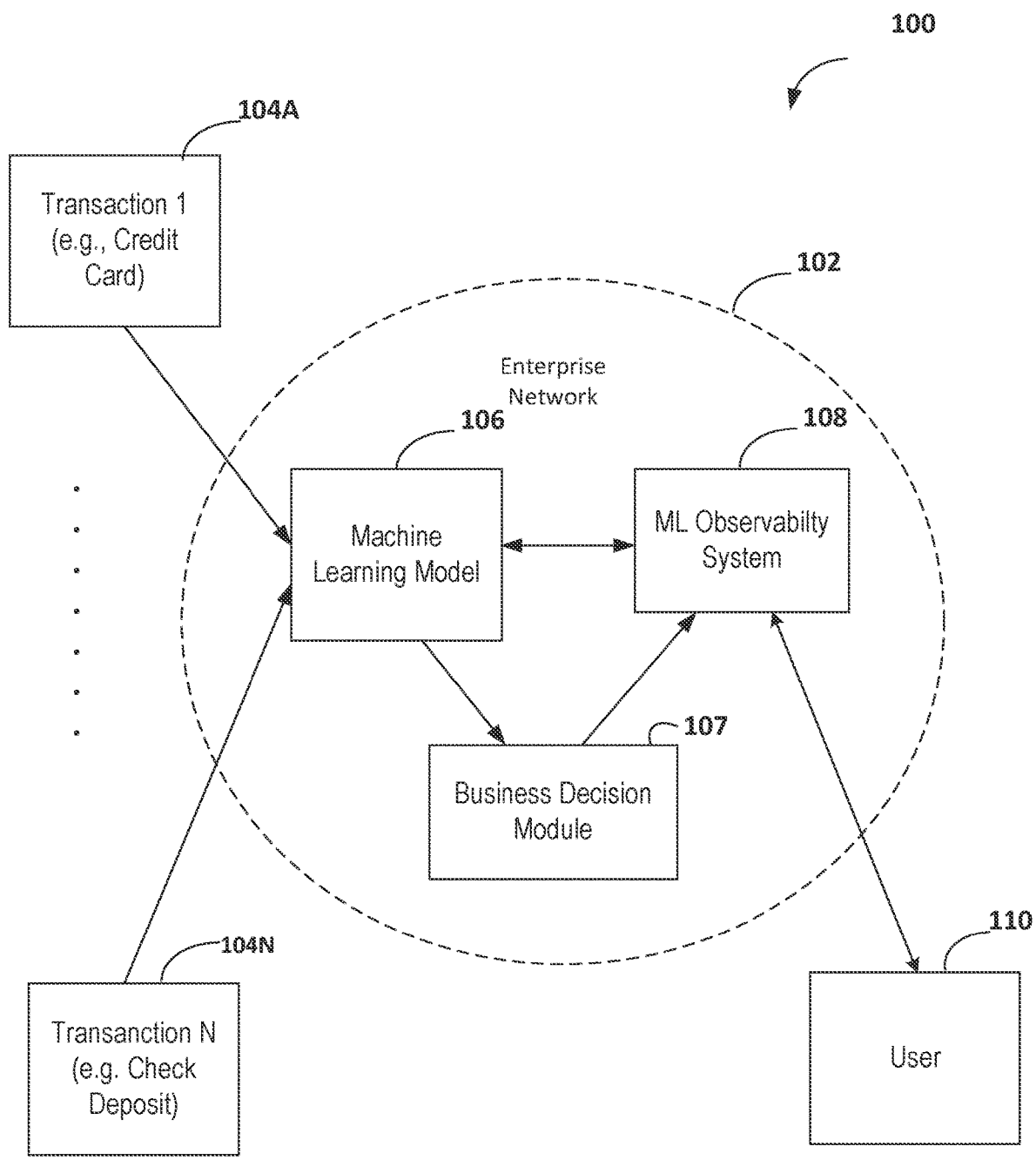
FIG. 1 illustrates a machine learning model update platform according to examples of the present disclosure.

As discussed above, a large number of machine learning models are deployed year after year, with the machine learning models becoming increasing accurate with use. The machine learning models are often deployed in real-time. An enterprise user may evaluate the accuracy or performance of a machine learning model. Upon completion, the evaluation process must then be repeated for each and every machine learning model within the enterprise. Because the typical enterprise deploys hundreds of machine learning models, it can be difficult, time consuming and daunting to evaluate each and every machine learning model deployed by the enterprise.

Accordingly, examples of the present disclosure address the foregoing by providing a real-time server system, computer-readable storage medium and method for determining anomalies in machine learning models and determining the impact of such anomalies on business output data. In one example, the system reads scored money movement transactions and business decision output data with a streaming feedback data loop in time windows to perform statistical analysis and capture a machine learning model's performance as will be further described with reference to FIG. 1. The system is fast, and can perform observability and remediation in real-time for very largescale models with 1000 TPS (Transactions Per Second) and around 50 million transactions per day. An enterprise user can effortlessly utilize the present disclosure to quickly evaluate hundreds of machine learning models within an enterprise.

For some examples, the system accesses, a network via a network communication interface to receive machine learning model variables to determine anomalies in a machine learning model. As used herein, a "machine learning model variable" may be a measurable property or attribute of the machine learning model. An example of a machine learning model variable is a fraud probability score.

The system determines a deviation in behavior of the machine learning model based on each machine learning model variable. The deviation is determined by performing statistical analysis to identify statistical differences between the machine-learning-model variable data captured in a given time window and machine-learning-model variable data captured in a previous time window, where the previous time window is at the same time of a prior day, a prior week, or other recurring intervals.

If statistical differences exist between the given time window and the previous time window, the system performs anomaly detection to determine whether the statistical differences are anomalies. The system then determines whether the anomaly causes an impact on business decision output data. If the anomaly does cause an impact, the system identifies the root cause of the anomaly, and then outputs an alert or score indicating the identified root cause of the detected anomaly.

Here, the business impact may be determined based on an aggregate number of approved money movement transactions in a given time window. By evaluating the impact of an anomaly on business decision output data, the present disclosure can control transaction flow of the enterprise. That is, the system may also adjust (via a dialer) a threshold for the number of the approved (or declined) money movement transactions to mitigate the impact of the anomaly on the business decision output data, or maintain transaction flow of an enterprise.

FIG. 1 illustrates a machine learning model update platform 100 according to examples of the present disclosure. In FIG. 1, machine learning model update platform 100 includes an enterprise network 102 that includes a machine learning model 106 and an ML observability system 108 to monitor and evaluate the performance of the machine learning model 106.

Here, the machine learning model 106 may be a point-of-sale fraud detection model, although the present disclosure is applicable to other types of machine learning models. For example, the present disclosure may be applicable to loan eligibility type machine learning models.

The machine learning model 106 itself receives and processes money movement transactions including transaction 104A through transaction 104N. In this example, money movement transaction 104A may be a credit card transaction such as a purchase from a brick-and-mortar or online retail store. Money movement transaction 104N may be a mobile check deposit at a bank, for example. Although not illustrated, the transactions 104A-104N may be other transaction types, for example, related to money movement transaction including automated clearing house (ACH) transactions, debit card transactions, crypto transactions and the like.

The machine learning model 106 may model, calculate and output scores, specifically the probability that each one of transaction 104A-104N is fraud based on contextual information (for example) such as location information, zip code, state, country, latitude and longitude, etc. The fraud probability score indicates whether a transaction is likely fraudulent.

In FIG. 1, machine learning model update platform 100 may also include a business decision module 107 communicably coupled to the machine learning model 106 and the ML observability system 108. The business decision module 107 receives fraud probability scores from the machine learning model 106 and uses the fraud probability scores, in part, to reach real-time business approval/decline decisions, approving or denying the money movement transactions 104A through 104N.

However, the machine learning model 106 may drift, change its behavior or otherwise become inaccurate, thereby unduly restricting transaction flow for the enterprise. For example, the machine learning model 106 may incorrectly indicate that a transaction is likely fraud, when in fact, the transaction is legitimate. The resulting inaccurate probability score is communicated to the business decision module 107, which consequently generates an incorrect business decision output data based on the wrong fraud probability score. The machine learning model 106 may output too many denials including false positives, which can impact the business decision output data.

By "impact," it is meant that a deviation in one or more variables of the machine learning model causes the transaction flow of an enterprise to increase (or decrease). "Impact" may also refer to a machine learning model variable that increases or reduces the revenue or profitability of an enterprise associated with the machine learning model.

Note that, for some examples, a deviation in the behavior of the machine learning model 106 may not necessarily have an enterprise impact, or where the deviation is insignificant. In view of the machine learning model drift or inaccuracy, the ML observability system 108 monitors the machine learning model 106 for such inaccuracies.

In operation, the system is initiated when ML observability system 108 begins to receive both money movement transaction information from machine learning model 106 and business decision output data from business decision module 107. In one implementation, the money movement transaction information may be fraud probability scores while the business decision output data may include approval/decline decisions for money movement transactions.

The ML observability system 108 begins by analyzing whether deviations exist in the machine learning model (106) variables, and if so, whether the deviations are anomalies. In one example, the ML observability system 108 determines an anomaly by allocating machine-learning-model variable data into a series of time windows, and applying statistical analysis to the time windows. The resulting statistical differences between current time windows and prior time windows may indicate deviations, but not necessarily abnormal deviations.

For some examples, ML observability system 108 may then apply an anomaly algorithm (e.g., Isolation Forest) that uses the statistical differences and deviations to determine the existence of an anomaly. Once an anomaly is determined, the anomaly must also be sufficiently significant, e.g., to cause an appreciable change/business impact on the number of transactions (e.g. approved). If so, then a root cause of the anomaly is determined. An alert or score indicating the root cause of the anomaly may be output for remediation.

ML observability system 108 can also apply statistical analysis/anomaly detection to each and every variable of the machine learning model. As mentioned above, after an anomaly is detected, ML observability system 108 then performs root cause analysis to detect the root cause of the anomaly as further described with reference to FIG. 2 below.

Referring to FIG. 1, the ML observability system 108 may also provide recommendations to correct for anomalies as well as display associated data reports. A user 110 may manage the machine learning model 106 based on results from the ML observability system 108, management may include updating variables of the machine learning model 106 via a user interface (not shown) to the ML observability system 108.

Figure 2:
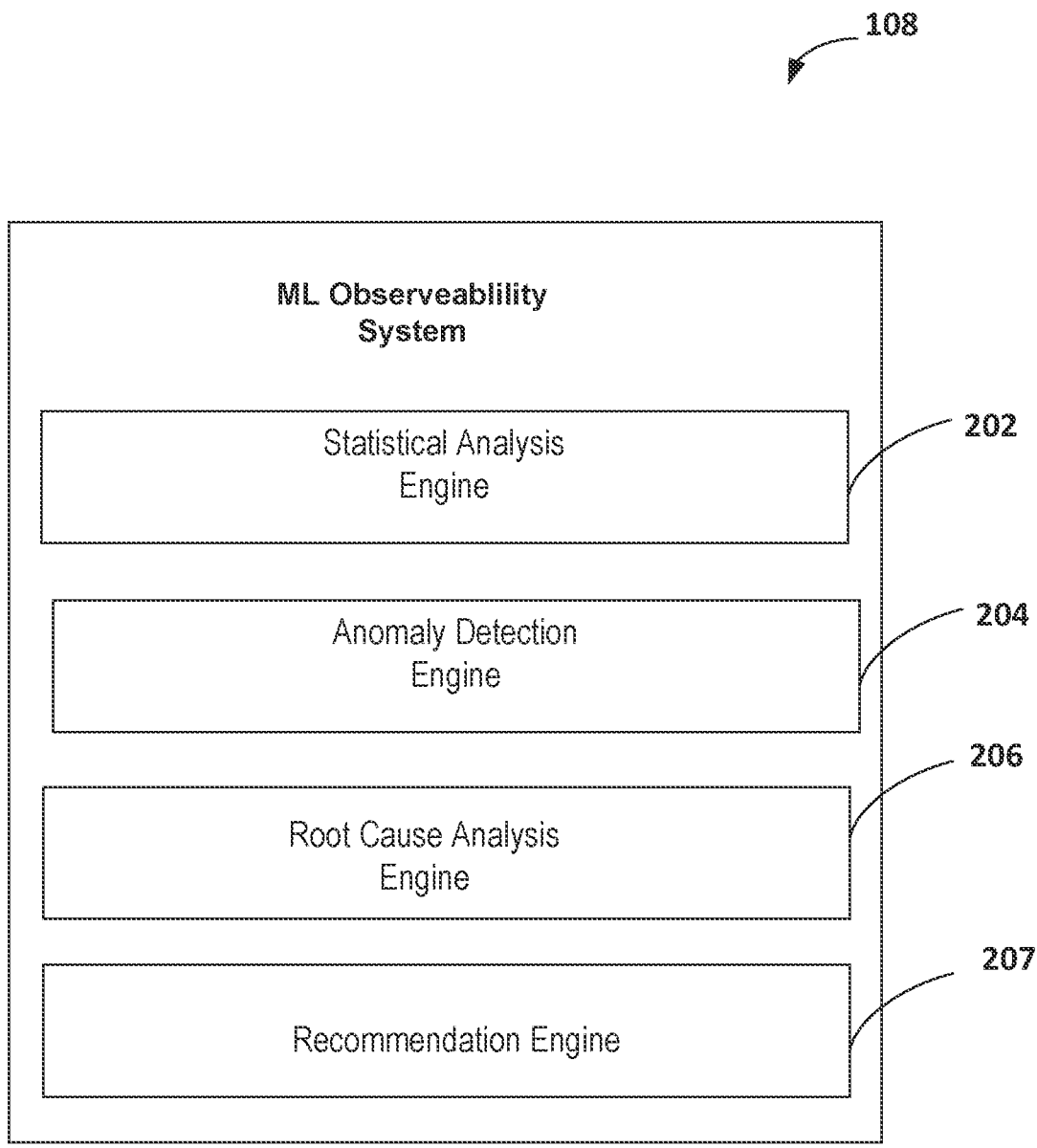
FIG. 2 illustrates components of the ML observability system of FIG. 1 according to examples of the present disclosure.

FIG. 2 illustrates components of the ML observability system 108 of FIG. 1 according to examples of the present disclosure.

As shown in FIG. 2, ML observability system 108 includes a statistical analysis engine 202, an anomaly detection engine 204, a root cause analysis engine 206 and a recommendation engine 207.

As implied by its name, the statistical analysis engine 202 performs statistical analysis to determine deviations in machine learning model variable data of the machine learning model 106 (FIG. 1). The statistical analysis engine 202 receives money movement transaction information from machine learning model 106 and from the business decision module 107 (FIG. 1). As used herein, a "money movement transaction" is a financial undertaking to transfer money electronically from one location to another. Examples of money movement transactions are transaction 104A (credit card) and 104N (check deposit) of FIG. 1. Other examples are wire transfers, ACH, debit cards, cash transfer cards, etc.

Consequently, "money movement transaction information" is data related to a money movement transaction. As an example, the number of money movement transactions or the transaction flow within a time window is referred to as money movement transaction information. A fraud probability score for a transaction is also deemed money movement transaction information. A business decision approval or rejection of a transaction is another example of money movement transaction information. The business decision information may include approval decisions discussed above (e.g., approved/authorized, denied/not authorized). The business decision approval or rejection may be a Boolean value, an integer, a text string, or other data type.

Upon receipt of the money movement transaction information, the statistical analysis engine 202 segregates the data into a series of time windows, and performs statistical analysis on the time windows as further described with reference to FIG. 3. If there is a statistical difference between a given time window and a previous time window, then the anomaly detection engine 204 determines whether the statistical difference is an anomaly. Once an anomaly is detected, the anomaly detection engine 204 forwards the anomaly information to the root cause analysis engine 206. The root cause analysis engine 206 may identify a root cause of the detected anomaly based on the money movement transaction information that triggered the detected anomaly.

The root cause analysis engine 206 may perform statistical analysis on multiple score segments to identify variables. The score segments may be a subset of transaction types that make up a particular category. For example, money movement transactions can have subsets of grocery payment movements, bill pay money movement, high value money movements etc., where in each subset a different nature of behavior and statistical analysis exist.

The variables identified as the root cause of the detected anomaly may include at least a fraud probability score, a transaction flow variable or a model drift variable that have drifted from the baseline and variables that contribute to the drift. The recommendation engine 207 may output an alert or score on a graphical user interface indicating that an anomaly is detected and recommended thresholds to remediate the anomaly. The alerts may also indicate the status of the variables that are identified.

Figure 3:
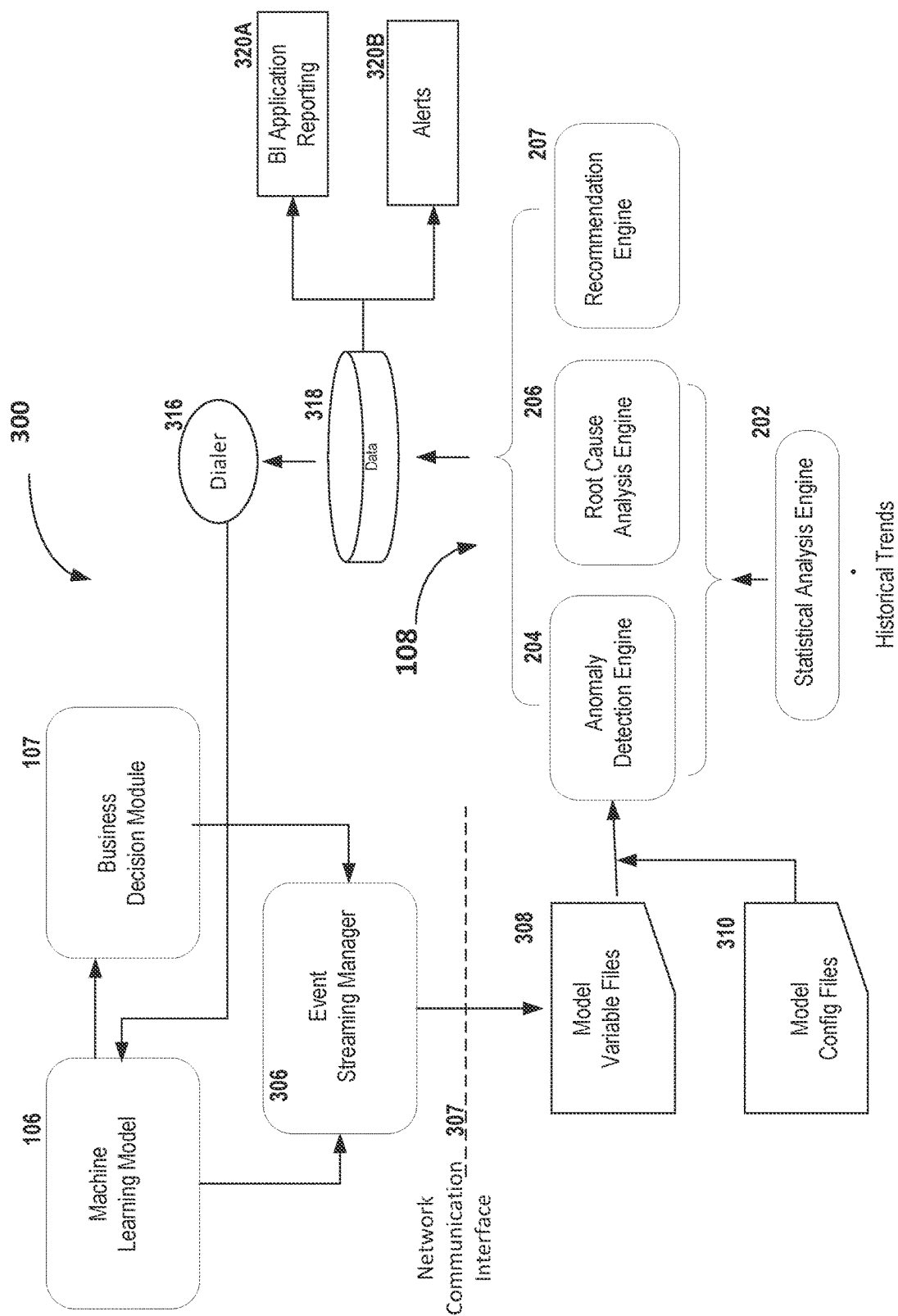
FIG. 3 illustrates a system architecture to incorporate the ML observability system of FIG. 1 according to an example of the present disclosure.

FIG. 3 illustrates a system architecture 300 to incorporate the ML observability system 108 of FIG. 1 according to an example of the present disclosure. As discussed, the ML observability system 108 monitors and evaluates the performance of the machine learning model 106.

In FIG. 3, the system architecture 300 includes the machine learning model 106, which in this example, is to initiate the fraud detection process. Specifically, among other machine learning model variables, the machine learning model 106 may generate a fraud probability score for a money movement transaction. As discussed above, the fraud probability score represents a likelihood that the money movement transaction is unauthorized or fraudulent.

After generation, the fraud probability score is delivered to the business decision module 107 (see also FIG. 1). The business decision module 107 receives the fraud probability score and generates business decision output data. The business decision output data includes an approval/rejection decision based on the fraud probability score. Here, the business approval/rejection decision either approves or rejects the money movement transaction. If the money movement transaction is rejected, the system does not process the money movement transaction (e.g., money, wire, etc. is credit is not moved from one point/account to another).

The business decision module 107 then forwards the business decision output data to an event stream manager 306. The event streaming manager 306 is a real-time streaming data platform that combines messaging, storage, and stream processing to allow storage and analysis of real-time data. The event stream manger 306 may be a Kafka™ queue, for example.

As noted, the event stream manager 306 receives business decision output data/real-time money movement transaction information from the business decision module 107. Contemporaneously, the event stream manager 306 also streams money movement transaction information from machine learning model 106. In one example, the money movement transaction information is extracted in micro-batches that are small groups of data that facilitate easier analysis, action or and reduce latency.

Thus, event stream manager 306 is a queue or source of real-time money movement transaction information that can be used for anomaly and deviation analysis. Event stream manager 306 may stream machine learning model variables such as fraud probability scores, business approval/decline decisions, the number of money movement transactions in a given window, model drift data, etc. Here, model drift is a decay of the models' performance as a result of the changes in real world environments.

In FIG. 3, the event stream manger 306 may store and transmit, via a network interface 307, the money movement transaction information as model variable files 308. In this example, the network communication interface 307 may separate an external network such as the cloud from an internal enterprise network. The model variable files 308, along with model configuration files 310 are transmitted to and/or accessed by the statistical analysis engine 202 and other components of ML observability system 108.

The statistical analysis engine 202 performs statistical analysis on each machine learning model variable. The statistical analysis is performed to identify statistical differences between model variable data captured in a given time window (e.g., 2:00-3:00 pm) and model variable data captured during a previous time window (e.g., yesterday, 2:00-3:00 pm). The previous time window and given time window are at the same time. The previous time windows may be for a prior day, prior week, prior month and/or prior year.

As used herein, a "statistical difference" indicates that the machine learning model variable's data captured in a given window and the data captured in a previous time window is significantly different, and is not based on chance. In other words, the difference is likely due to error. In one example, the statistical differences are determined by statistical methods. The statistical analysis engine 202 may utilize time-series data and historical trends data from a database to perform statistical analysis based on a P-test (Probability value test), a Z-test and/or PSI (Population Stability Index). In one implementation, the PSI identifies drift in variables behavior based on the moving average PSI and baseline PSI. In an implementation, the P-test indicates whether a deviation is score for a given window is significant or not significant.

The statistical analysis is a first layer of analysis to provide machine-learning-model variable deviations between the given time window and the previous time windows. However, such deviations may not necessarily be abnormal. In one example, the anomaly detection engine 204 may employ the Isolation Forest algorithm that uses binary trees to detect anomalies in a machine learning model variable space. Isolation Forest utilizes use lines that are orthogonal to the origin of the machine learning model variable space to split the space, and assigns higher anomaly scores to variable data points that need fewer splits to be isolated. The result of the Isolation Forest process determines whether the deviations are abnormal. In another example, the anomaly detection engine 204 may employ XGBoost (Extreme Gradient Boosting) that uses gradient-boosted decision trees for anomaly detection.

After anomaly detection, the root cause analysis engine 206 performs analysis by each score segment and analyzes variable level PSI, divergence index, Shapley scores and additional statistical analysis to identify the root cause, i.e., the machine learning model variables that are driving the deviation. Note that if the model detects an anomaly, it also provides the contributing features for the anomaly, these contributing factors provide insights on the reason why an anomaly is detected. The factors which are contributing are then assessed based on their statistical weightage, to identify the main contributors for the drift/anomaly and appropriate remediation will be implemented.

Based on the root cause of the machine learning model variable deviation, the recommendation engine 207 automatically and without user interaction, may recommend adjustments to the machine learning model 106 or associated processes to return the model to normal.

The systems may be integrated with a dialer 316 to recommend the necessary score thresholds and optimization values to maintain the same business flow or business impact. For example, if the abnormality results in an increase in the number of transactions getting declined, the dialer may recommend thresholds to reduce declines to maintain the same transaction flow.

In FIG. 3, system architecture 300 further includes summarized data database 318 for storing data related to statistical analysis engine 202, anomaly detection engine 204, root cause analysis engine 206 and recommendation engine 207. A Business Intelligence (BI) reporting application 320A may utilize the summarized data to report information such as scores via a graphical user interface (not shown). An alerts module 320B may similarly utilize the summarized data to generate alerts via email, for example.

Figure 4:
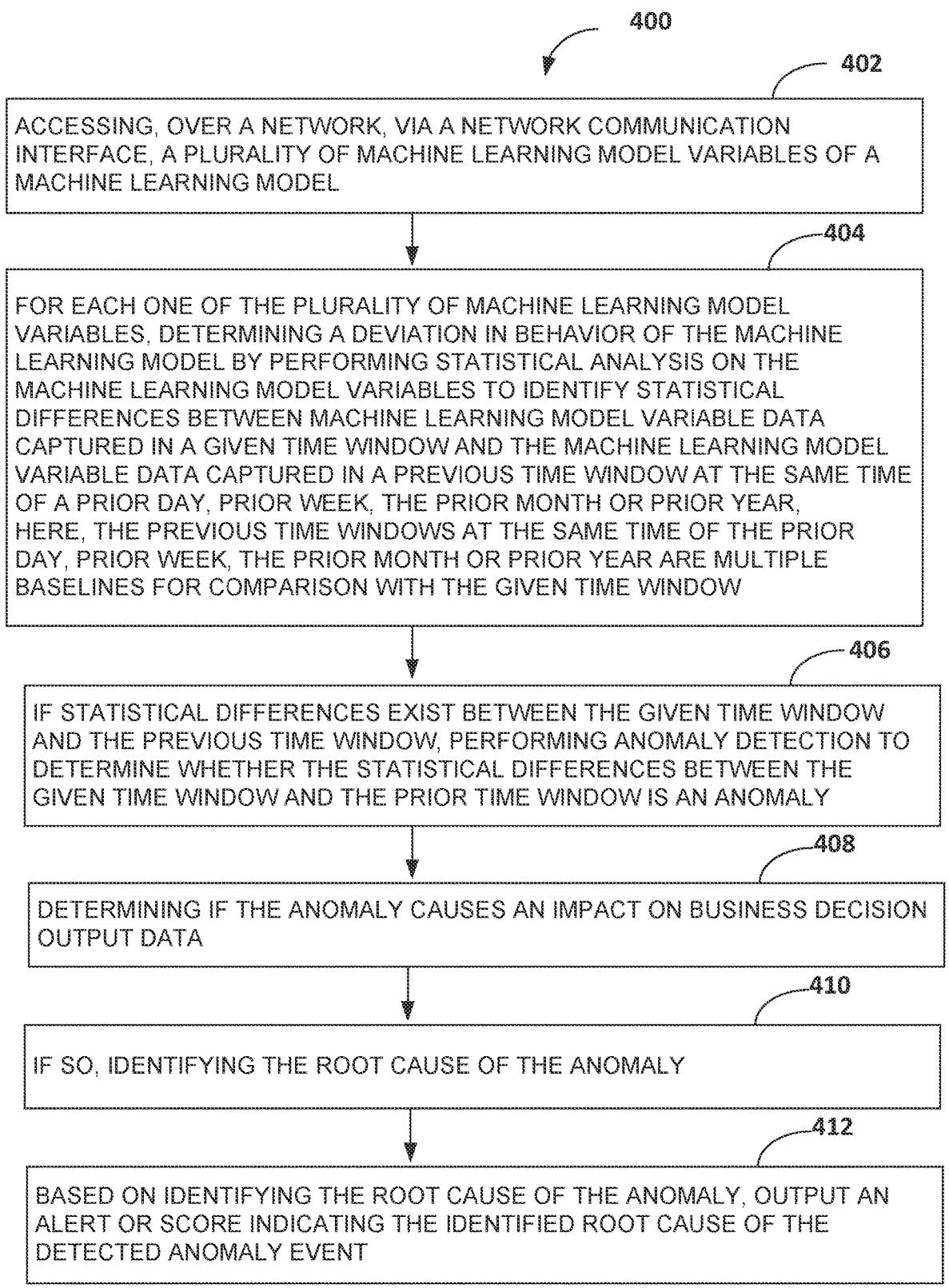
FIG. 4 illustrates a computer-implemented method for evaluating a real-time machine learning model according to an example of the present disclosure.

FIG. 4 illustrates a computer-implemented method 400 for evaluating a real-time machine learning model (e.g., 106 of FIG. 1) according to an example of the present disclosure.

In FIG. 4, at block 402, method 400 begins by accessing, over a network via a network communication interface (e.g., 307, FIG. 3), machine learning model variables for the machine learning model. Examples of machine learning model variables may be fraud probability scores, model drift variable, model stability variable and transaction flow variable.

At block 404, for each one of the machine learning model variables, method 400 determines a deviation in behavior of the machine learning model. The deviation in behavior may refer to a change in characteristic of the model for a particular variable.

The deviation in behavior is performed by performing statistical analysis on the machine learning model variables to identify statistical differences between machine learning model variable data as captured in a given time window and the machine learning model variable data captured in a previous time window. Here, the previous time window is at the same time of a prior day, prior week, the prior month or prior year as the given time window. In some examples, the previous time windows may be captured at different times, so long at those times are consistent. The previous time windows of the prior day, prior week, the prior month or prior year serve as multiple baselines for comparison with the given time window.

At block 406, if statistical differences exist between the given time window and the previous time window, the method performs anomaly detection to determine whether the statistical differences between the given time window and the prior time window is an anomaly.

At block 408, method 400 determines if the anomaly causes an impact on business decision output data. In one example, the business decision output data may be based on an aggregate number of approved money movement transactions in the given time window. In an example, method 400 may adjust a threshold for the number of the approved money movement transactions to mitigate the impact of the anomaly on the business decision output data.

At block 410, if the anomaly causes an impact on business decision output data, method 400 identifies the root cause of the anomaly.

At block 412, based on identifying the root cause of the anomaly, method 400 outputs an alert or score indicating the identified root cause of the detected anomaly event.

Figure 5:
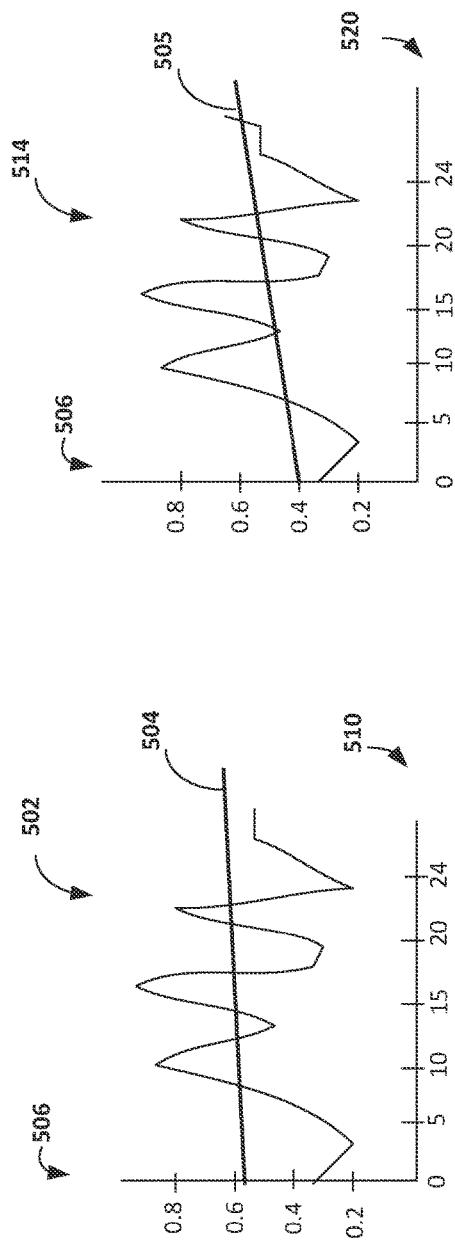
FIG. 5 illustrates a given time window and a previous time window of the ML observability system of FIG. 1 according to examples of the present disclosure.

FIG. 5 illustrates a given time window 502 and a previous time window 514 for a fraud probability score variable according to examples of the present disclosure.

In this example, the given time window 502 captures the fraud probability score variable to illustrate its deviation over a specific time duration, namely 24 hours. The 24-hour time period 510 depicted on the x-axis may be captured today on a Tuesday, for example. Although not illustrated, other time window periods (15 minutes, 30 minutes, etc.) can be utilized. Moreover, other variable deviations beyond the fraud probability score variable may also be determined.

The previous time window 514 also captures the fraud probability score variable for a 24-hour time period 520 for the preceding day Monday. Statistical analysis is performed on the given time window 502 and the previous time window 514 to identify statistical differences between the windows 502 and 514. Specifically, in FIG. 5, the PSI moving average 504 and the PSI moving average 505 of the fraud probability score are shown, where the PSI is between 0.0 and 0.8 as shown on the y-axis 506 during the given 24-hour time period.

Here, for the given time window 502, the PSI moving average 504 is slightly below and above 0.6. However, for the previous time window 514, the PSI moving average 505 extends between 0.4 and 0.6. In one example, if the change between the PSI moving averages is more than 3 standard deviations, then the difference can be said to be abnormal. The PSI moving averages may also be compared the baseline PSI to confirm significant statistical differences. In some examples, in addition to PSI, the Z-Score (which defines the weighted distribution difference between a group of records and each entry) may be utilized to capture the statistical differences between the given time window 502 and the previous time window 514. In a further example, historical model deviation results reported for a given variable may be utilized (in addition to/in lieu of the PSI or the Z-score). The anomaly detection engine 204 may employ the aforementioned methods and Isolation-Forest based training to determine the anomaly of the current entry against all of the different varying time window entries. In an example, a sample population of the last three months is used; the system compares the given hourly window to the last three months, i.e., 3*30*24=2160 entries.

For some examples, the system may compute an anomaly score for a given window and then execute Shapley and Gain values of the model for a given inference. If the anomaly score is more than the classification threshold/AUC (Area Under Curve) value (0.5), the current entry is considered an anomaly. The Shapley value determines the contribution value for a given prediction. The Gain value determines the percentage of the model inference score which is attributed to each variable. The Shapley and Gain values provide direct correlation on which features or attributes contribute to a given anomaly, e.g., features with the highest gain values. Root cause of the anomaly may also be determined via the above-mentioned techniques.

Figure 6:
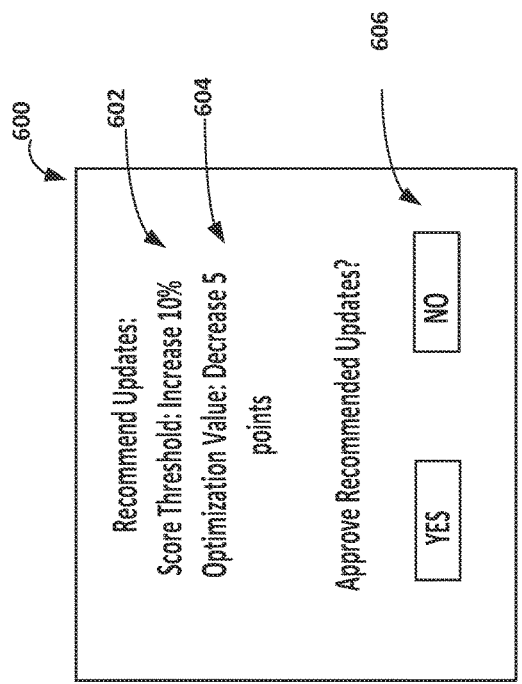
FIG. 6 illustrates a recommendation dashboard of the ML observability system of FIG. 1 according to examples of the present disclosure.

FIG. 6 illustrates a recommendation dashboard 600 of the ML observability system 108 of FIG. 1 according to examples of the present disclosure. The ML observability system 108 uses the root cause analysis engine 206 of FIG. 2 to determine a root cause of a machine-learning-model variable deviation. The recommendation engine 207 of FIG. 2 then generates a recommendation based on the root cause analysis. As shown, the recommendation engine 207 is displaying a recommendation to increase the score threshold by 10% as shown at 602 and to decrease the optimization value by 5 points as shown at 604. A user may select the "YES" or "NO" buttons to accept or reject the recommendation.

Figure 7A:
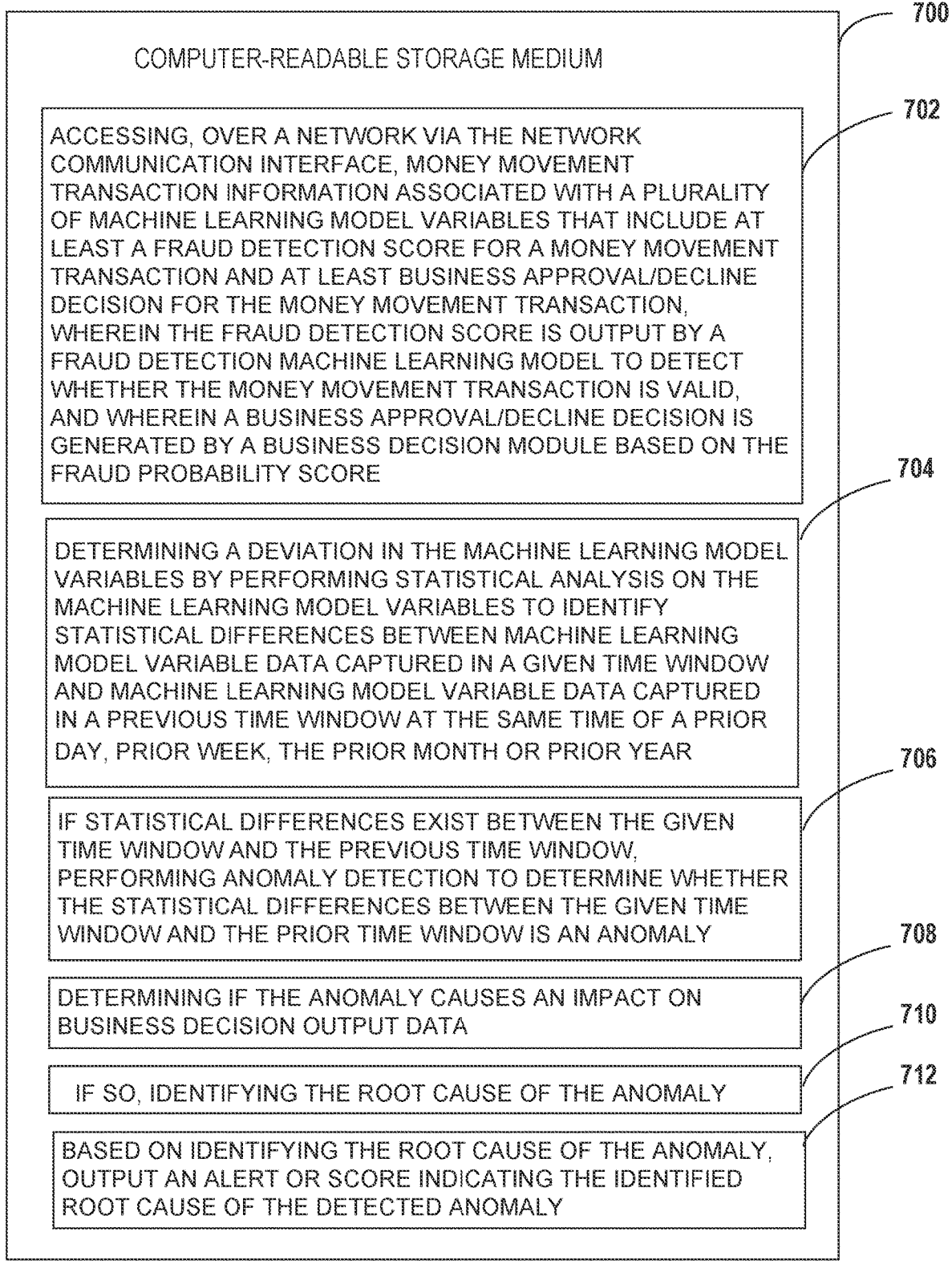
FIG. 7A illustrates example instructions stored on a non-transitory computer-readable storage medium for determining machine learning model anomalies and impact on business output data according to one example of the present disclosure.
Figure 7B:
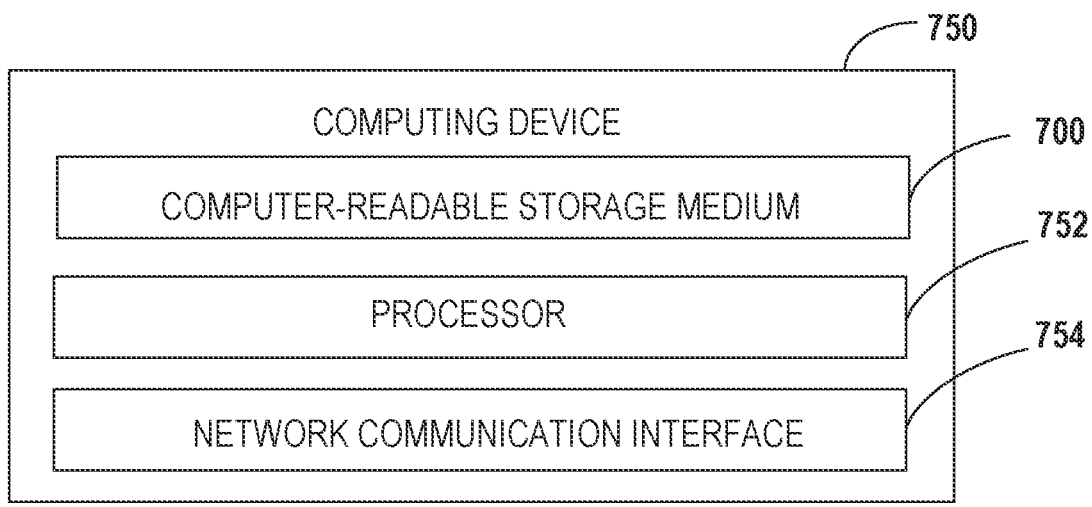
FIG. 7B illustrates an example computing device according to the present disclosure.

FIG. 7A illustrates example instructions stored on a non-transitory computer-readable storage medium 700 for determining machine learning model anomalies and impact on business output data according to one example of the present disclosure, and FIG. 7B illustrates an example computing device 750 according to the present disclosure.

As shown in FIG. 7A, the non-transitory computer-readable storage medium 700 includes instruction 702, instruction 704, instruction 706, instruction 708, 710 and 712.

Instruction 702 may cause a processor 752 to access, over a network via a network communication interface, money movement transaction information associated with machine learning model variables. The machine learning variables may include at least a fraud detection score for a money movement transaction and at least business approval/decline decision for the money movement transaction. The fraud detection score may be output by a fraud detection machine learning model to detect whether the money movement transaction is valid, a business approval/decline decision is generated by a business decision module based on the fraud probability score.

Instruction 704 may cause a processor 752 determine a deviation in the machine learning model variables by performing statistical analysis on the machine learning model variables to identify statistical differences between machine learning model variable data captured in a given time window and machine learning model variable data captured in a previous time window at the same time of a prior day, prior week, the prior month or prior year.

Instruction 706 may cause a processor 752, if statistical differences exist between the given time window and the previous time window, to perform anomaly detection to determine whether the statistical differences between the given time window and the prior time window are an anomaly.

Instruction 708 may cause a processor 752 to determine if the anomaly causes an impact on the business decision output data.

Instruction 710 may cause a processor 752 to identify the root cause of the anomaly if the anomaly causes an impact on business decision output data.

Instruction 712 may cause a processor 752, based on identifying the root cause of the anomaly, to output an alert or score indicating the identified root cause of the detected anomaly.

The non-transitory computer-readable storage medium 700 may be any electronic, magnetic, optical, or other physical storage device that stores executable instructions. For example, the non-transitory computer-readable storage medium 700 may be random access memory (RAM), an electrically-erasable programmable read-only memory (EEPROM), a storage drive, an optical disc, or the like. The non-transitory computer-readable storage medium 700 can be encoded to store executable instructions that cause the processor 752 to perform operations according to examples of the disclosure.

The present disclosure may employ a software stack to enlist the underlying tools, frameworks, and libraries used to build and run example applications of the present disclosure. Such a software stack may include PHP, React®, Cassandra™, Hadoop®, Swift®, etc. The software stack may include both frontend and backend technologies including programming languages, web frameworks servers, and operating systems. The frontend may include JavaScript®, HTML, CSS, and UI frameworks and libraries. In one example, a MEAN (MongoDB®, Express.js, AngularJS, and Node.js) stack may be employed. In another example, a LAMP (Linux®, Apache®, MySQL@, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit Any suitable programming language can be used to implement the routines of particular examples including C, C++, Java®, JavaScript®, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A real-time server system comprising:
a network communication interface;
a storage medium having instructions;
a processor that executes the instructions to perform operations comprising:
  implementing a machine learning model update platform comprising a machine learning model, an enterprise network, and a machine learning observability system program;
  accessing, over the enterprise network via the network communication interface, a plurality of machine learning model variables for the machine learning model;
  executing the machine learning observability system program that detects a drift comprising a decay of the machine learning model based on a deviation in behavior of the machine learning model associated with the plurality of machine learning model variables,
  wherein the deviation is based on an unsupervised machine learning algorithm comprising an isolation forest algorithm that performs a statistical analysis on the plurality of machine learning model variables that identifies statistical differences between machine learning model variable data captured in a given time window and machine learning model variable data captured in a previous time window at a same time of at least one from among a prior day, a prior week, a prior month, and a prior year;
  in response to the statistical differences existing between the given time window and the previous time window, performing anomaly detection based on at least one from among the unsupervised machine learning algorithm and a gradient-boosted decision tree algorithm that evaluates to whether the statistical differences between the given time window and the previous time window are an anomaly, and whether the anomaly impacts business decision output data;

in response to the anomaly impacting the business decision output data, executing the machine learning observability system program that ascertains a root cause of the anomaly; and based on the root cause of the anomaly, adjusting the machine learning model with an updated machine learning model variable until the machine learning model operates within a predetermined normal operation, and outputting at least one from among an alert and a score indicating the identified root cause of the detected anomaly.

2. The real-time server system of claim 1, wherein the business decision output data is based on an aggregate number of approved money movement transactions in the given time window.

3. The real-time server of claim 2, wherein the instructions further comprise adjusting a threshold for at least one from among the number of the approved and declined money movement transactions to mitigate the impact of the anomaly on the business decision output data.

4. The real-time server system of claim 1, wherein the plurality of machine learning model variables comprises a fraud probability score generated by a point of sale fraud detection machine learning model that determines fraud probability scores for a plurality of money movement transactions.

5. The real-time server system of claim 4, wherein the plurality of machine learning model variables comprises at least one from among a business approval decision and a business decline decision generated by a business decision module based on the fraud probability score.

6. The real-time server system of claim 1, wherein the plurality of machine learning model variables comprises a number of money movement transactions in the given time window.

7. The real-time server of claim 1, wherein the machine learning model variable is selected from a fraud probability score, at least one from among a business approval decision and a business decline decision, a number of money movement transactions in the given time window.

8. The real-time server of claim 1, wherein the previous time window for the same time of at least one from among the prior day, the prior week, the prior month, and the prior year represent multiple baselines for comparison with the given time window.

9. A non-transitory computer-readable storage medium including computer-executable instructions stored thereon which, when executed by a processor, causes the processor to perform the following operations:

implementing a machine learning model update platform comprising a machine learning model, an enterprise network, and a machine learning observability system program;

accessing, over the enterprise network via a network communication interface, a money movement transaction information associated with a plurality of machine learning model variables for the machine learning model that include at least one of a fraud detection score for a money movement transaction and at least one from among a business approval decision and a business decline decision for the money movement transaction, wherein the fraud detection score is outputted by the fraud detection machine learning model that detects whether the money movement transaction is valid, and wherein at least one from among a business approval decision and a business decline decision is generated by a business decision module based on the fraud probability detection score;

executing the machine learning observability system program that detects a drift comprising a decay of the machine learning model based on a deviation in behavior of the machine learning model associated with the plurality of machine learning model variables, wherein the deviation is based on an unsupervised machine learning algorithm comprising an isolation forest algorithm that performs a statistical analysis on the plurality of machine learning model variables that identifies statistical differences between machine learning model variable data captured in a given time window and machine learning model variable data captured in a previous time window at a same time of at least one from among a prior day, a prior week, a prior month, and a prior year;

in response to the statistical differences existing between the given time window and the previous time window, performing anomaly detection based on at least one from among the unsupervised machine learning algorithm and a gradient-boosted decision tree algorithm that evaluates whether the statistical differences between the given time window and the previous time window are an anomaly, and whether the anomaly impacts business decision output data;

in response to the anomaly impacting the the business decision output data, executing the machine learning observability system program that ascertains a root cause of the anomaly; and based on the root cause of the anomaly, adjusting the machine learning model with an updated machine learning model variable until the machine learning model operates within a predetermined normal operation, and outputting at least one from among an alert and a score indicating the identified root cause of the detected anomaly.

10. The non-transitory computer-readable storage medium of claim 9, wherein the business decision output data is based on an aggregate number of approved money movement transactions in the given time window.

11. The non-transitory computer-readable storage medium of claim 10, wherein the instructions further comprise adjusting a threshold for at least one from among the number of the approved and declined money movement transactions to mitigate the impact of the anomaly on the business decision output data.

12. The non-transitory computer-readable storage medium of claim 9, wherein the plurality of machine learning model variables comprises a fraud probability score generated by a point of sale fraud detection machine learning model that determines fraud probability scores for a plurality of money movement transactions.

13. The non-transitory computer-readable storage medium of claim 12, wherein the plurality of machine learning model variables include at least one from among a business approval decision and a business decline decision based on the fraud probability score.

14. The non-transitory computer-readable storage medium of claim 9, wherein the plurality of machine learning model variables comprise a number of money movement transactions in the given time window.

15. The non-transitory computer-readable storage medium of claim 9, wherein the previous time window for the same time of at least one from among the prior day, the prior week, the prior month, and the prior year represent multiple baselines for comparison with the given time window.

16. A computer-implemented method for determining anomalies in machine learning models and impact on business output data, the computer-implemented method comprising:
- implementing a machine learning model update platform comprising a machine learning model, an enterprise network, and a machine learning observability system program;
- accessing, over the enterprise network via a network communication interface, a plurality of machine learning model variables for the machine learning model;
- executing the machine learning observability system program that detects a drift comprising a decay of the machine learning model based on a deviation in behavior of the machine learning model associated with the plurality of machine learning model variables,
- wherein the deviation is based on an unsupervised machine learning algorithm comprising an isolation forest algorithm that performs a statistical analysis on the plurality of machine learning model variables that identifies statistical differences between machine learning model variable data captured in a given time window and machine learning model variable data captured in a previous time window at a same time of at least one from among a prior day, a prior week, a prior month, and a prior year, wherein previous time window at the same time of at least one from among the prior day, the prior week, the prior month, and the prior year represent multiple baselines for comparison with the given time window;
- in response to the statistical differences existing between the given time window and the previous time window, performing anomaly detection based on at least one from among the unsupervised machine learning algorithm and a gradient-boosted decision tree algorithm that evaluates to whether the statistical differences between the given time window and the previous time window are an anomaly, and whether the anomaly impacts business decision output data;
- in response to the anomaly impacting the business decision output data, executing the machine learning observability system program that ascertains a root cause of the anomaly; and
- based on the root cause of the anomaly, adjusting the machine learning model with an updated machine learning model variable until the machine learning model operates within a predetermined normal operation, and outputting at least one from among an alert and a score indicating the identified root cause of the detected anomaly.

17. The computer-implemented method of claim 16, wherein the business decision output data is based on an aggregate number of approved money movement transactions in the given time window.

18. The computer-implemented method of claim 17, further comprising:
- adjusting a threshold for the aggregated number of approved money movement transactions to mitigate the impact of the anomaly on the business decision output data.

* * * * *